United States Patent [19]

Kosono et al.

[11] 3,905,649
[45] Sept. 16, 1975

[54] WHEELS FOR ROLLER SKATES AND THE LIKE

[76] Inventors: Kazuhiro Kosono; Yasukazu Kosono, both of No. 9-1, Asakusa 7-chome, Taito-ku, Tokyo, Japan

[22] Filed: May 30, 1973

[21] Appl. No.: 365,251

[52] U.S. Cl. .............................. 301/5.7; 308/189 R
[51] Int. Cl. ........................................... A63c 17/22
[58] Field of Search ............ 301/5.7, 5.3; 308/190, 308/191, 189 R

[56] References Cited
UNITED STATES PATENTS

| | | | |
|---|---|---|---|
| 2,534,401 | 12/1950 | Blaes | 301/5.7 |
| 2,622,930 | 12/1952 | Negri | 301/5.7 |
| 3,019,067 | 1/1962 | Schnell | 308/189 R |
| 3,034,839 | 5/1962 | Schoos | 308/190 |
| 3,552,812 | 1/1971 | Howe | 308/189 R |

FOREIGN PATENTS OR APPLICATIONS
955,185   4/1964   United Kingdom ................. 301/5.7

*Primary Examiner*—Robert S. Ward, Jr.
*Assistant Examiner*—Reinhard J. Eisenzopf
*Attorney, Agent, or Firm*—Cushman, Darby & Cushman

[57] ABSTRACT

A roller skate wheel having a structure including two ball bearings each comprising an outer shell produced from a single metal plate and having a channel-like sectional profile and a sleeve having a flange, said sleeve being fitted in a central hole of said outer shell via a number of steel balls, said two ball bearings being fitted in a central hole of the wheel such that their like ends abut each other. It is suited for use where heavy and complicated loads are suddenly applied such as in roller skates.

4 Claims, 10 Drawing Figures

WHEELS FOR ROLLER SKATES AND THE LIKE

BACKGROUND OF THE INVENTION

The wheels of roller skates are often provided with ordinary ball bearings that are utilized as mechanical elements for torque transmitting mechanisms. However, since steel balls are fitted or received in shallow grooves, heavy and suddenly changing loads cannot be received, which makes the wheels and their bearings prone to damage in a short period of use.

SUMMARY OF THE INVENTION

A first object of the invention is to provide a wheel which can withstand heavy loads.

A second object of the invention is to provide a wheel which can withstand suddenly changing loads.

A third object of the invention is to provide a wheel which ensures smooth rotation even under severe operating conditions.

A fourth object of the invention is to provide a wheel whose parts can be readily processed.

A fifth object of the invention is to provide a wheel which can be readily assembled and whose manufacturing cost is low.

The above and other objects of the invention will become more apparent from the following description with reference to the accompanying drawing.

BRIEF DESCRIPTION OF THE DRAWING

The drawing illustrates preferred embodiments of the invention, and in which.

DETAILED DESCRIPTION OF THE PREFERRED EMBODIMENT

Figure 1:
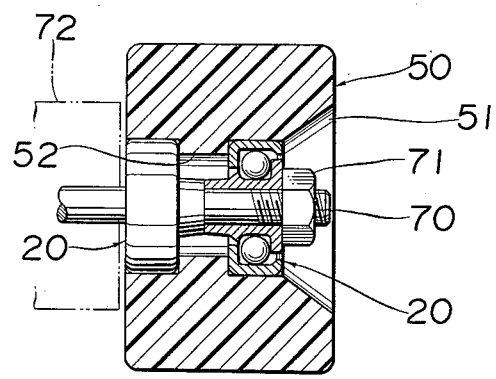
FIG. 1 is an axial sectional view of a wheel according to the invention.
Figure 2:
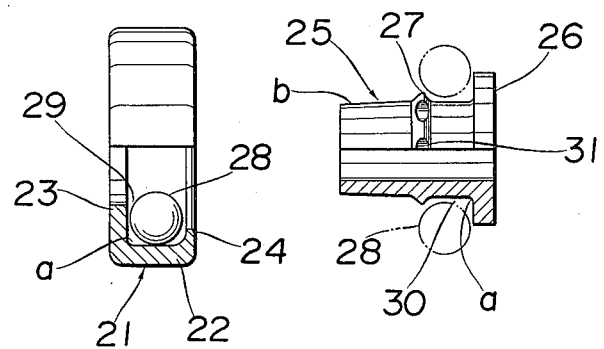
FIG. 2 is an exploded view partly in section showing a ball bearing used in the wheel of FIG. 1.

FIG. 1 is an axial sectional representation of a typical wheel according to the invention. Reference numeral 20 designates a ball bearing constituting the main component, numeral 50 a wheel body with two ball bearings 20 fitted in its central hole 51, numeral 52 a shoulder portion intervening between outer shells of the two ball bearings 20 for holding them at a predetermined spacing, numeral 70 a wheel axle carrying the wheel according to the invention, numeral 71 a nut screwed on the wheel axle 70 for keeping the wheel against departure thereof off the axle, and numeral 72 a support member supporting the wheel axle 70. The illustrated wheel body 50 is made of hard rubber, but it may also be produced from plastics and metals. The detailed construction of the ball bearing mentioned above is shown in FIG. 2 as a partly sectional exploded view and in FIG. 3 as a partly broken front view of the assembled state.

Figure 3:
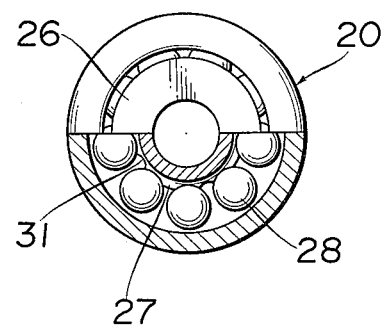
FIG. 3 is a front view partly broken away showing the same ball bearing in the assembled state.

In these Figures, numeral 21 designates an outer shell having a channel-shaped sectional profile with opposite end portions 23 and 24 formed at the opposite ends of a peripheral portion 22. Numeral 25 designates a sleeve member provided with a flange 26 and an inner annular ridge 27 and having a central axle hole, in which the wheel axle 70 is received. Numeral 28 designates steel balls. These steel balls 28 are received in the peripheral grooves 29 and 30 defined by the end portions 23, 24, flange 26 and ridge 27 in the assembled state of the ball bearing as shown in FIGS. 1 and 3. To assemble the ball bearing 20, a pre-determined number of steel balls 28 are first inserted in the groove 29 in the outer shell 21, and then the sleeve 25 is pressure fitted in the central portion of the annular arrangement of the steel balls from the side of the annular ridge 27. At this time, the ridge 27 is brought to the other side of the steel ball arrangement due to its partial deformation (as indicated as depressions 31 in FIGS. 2 and 3), whereby the steel balls 28 are fitted in the groove 30. In this assembled state all the steel balls 28 will not simultaneously come to the position of the depressions 31 formed in the annular ridge 27, so that the ball bearing 20 will not be readily disassembled. In the above ball bearing, the end portion 23 of the outer shell 21 and the flange 26 of the sleeve 25 are made sufficiently large compared to the other end portion 24 and the ridge 27 respectively. Thus, forces acting such as to clamp the steel balls 28 between the end portion 23 and flange 26 can be strongly borne, but forces in the opposite direction, i.e., those acting such as to clamp the steel balls 28 between the end portion 24 and ridge 27 (that is, forces in the direction opposite to the force applied to the outer shell 21 and sleeve 25 at the time of assembling the ball bearing 20) is weakly borne. In the wheel according to the invention, the above weak point of the ball bearing 20 is overcome by using two (or more than two) ball bearings 20 with the sleeves 25 arranged in a symmetrically abutting relation (as shown in FIG. 1).

With this arrangement of ball bearings 20, the right hand side ball bearing 20 receives forces acting in the right hand direction, while the left hand ball bearing 20 receives forces acting in the left hand direction, so that this construction is very stout and strong. As an alternative arrangement, the flanges 26 of the two sleeves 25 may be abutted unlike the illustrated arrangement. In this case, however, the spacing of the two ball bearings 20 (i.e., the spacing of the two outer shells) is reduced, which is disadvantageous in that the flanges 26 cannot effectively fulfill their function (whereas in the arrangement of FIG. 1 the nut 71 and support member 72 are uged against them respectively).

The outer shell 21 is produced by processing a single metal plate. At this time, the end portion 23 and peripheral portion 22 are formed through the usual process with a press, and the end portion 24 is formed without deforming the peripheral portion 22 with a rolling means which is developed by the inventor of the instant invention. The sleeve 25 is produced through the usual cutting and grinding process. It is effective for improving the function of the ball bearing to finish the curved surface of the corner of the grooves 29 and 30 to coincide the roundness of the steel ball 28 as closely as possible.

Figure 4:
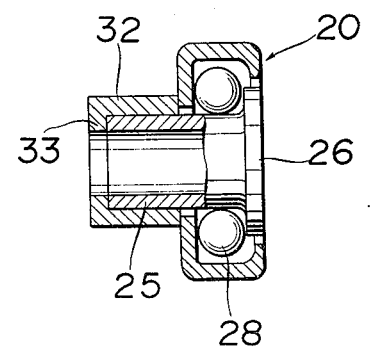
FIG. 4 is an axial sectional view showing another ball bearing.
Figure 5:
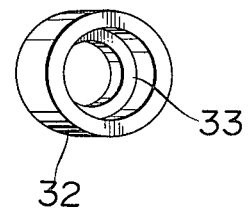
FIG. 5 is a perspective view of a retaining ring used for the ball bearing of FIG. 4.

FIGS. 4 and 5 show a different embodiment of the ball bearing. In this example, the sleeve 25 is not provided with any annular ridge, and instead a retaining ring 33 having a bottom 32 is used. This retaining ring 32 is pressure fitted on an end portion b of the sleeve 25 for preventing the departure of the outer shell 21 off the sleeve 25. It is superior to other rings that will be described hereinafter since it can be held at a correct distance from the flange 26 by virtue of its bottom 33.

Figure 7:
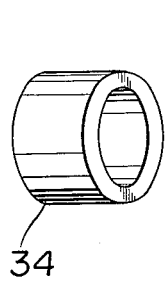
FIG. 7 is a perspective view of a retainer ring used for the ball bearing of FIG. 6.
Figure 6:
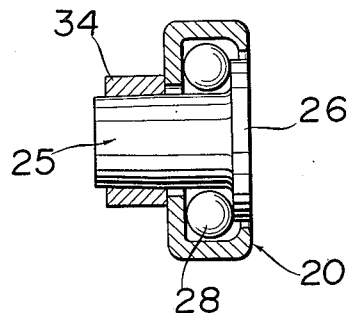
FIG. 6 is an axial sectional view showing a ball bearing different from those of FIGS. 2 and 4.
Figure 8:
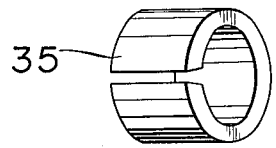
FIG. 8 is a perspective view showing a further retainer ring.

FIGS. 6 and 7 show a still different ball bearing. In this example, a retainer 34 without any bottom is used in lieu of the ring 32 of the FIG. 4 example. FIG. 8 shows a still different retaining ring. This retaining ring 35, unlike the cylindrical retainer 34 of FIG. 7, has a gap, so that it can fit on the sleeve 25 due to its own spring force. It is also possible to form a gap in the retaining ring 32 of FIG. 5 for providing the spring force.

Figure 10:
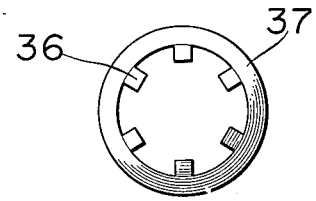
FIG. 10 is a front view showing a retaining ring used for the ball bearing of FIG. 9.
Figure 9:
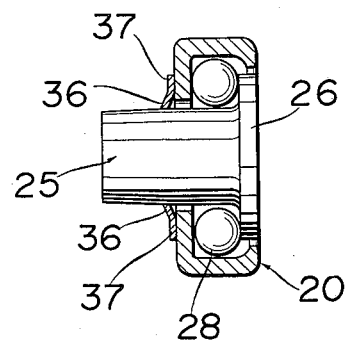
FIG. 9 is an axial sectional view showing a ball bearing different from those of FIGS. 2, 4 and 6.

FIGS. 9 and 10 show a still further embodiment of the ball using a retaining ring 37 having claws 36. As a further example of the retaining ring, it is also possible to use the usual stopper ring which may be fitted in a peripheral groove formed in the sleeve 25.

In this embodiment of FIGS. 9 and 10, the following may be mentioned as,

I. The end portion *b* of the sleeve 25 is usually tapered. By so doing, the assembly of the ball bearing can be facilitated.

II. Instead of directly abutting the sleeves 25 of the two ball bearings 20 it is also possible to insert other member such as washers between them.

III. When the wheel is assembled, the departure of the sleeve 25 of the ball bearing is prevented, so that the ridge 27 or retainer ring 32, 34, 35 or 37 is not an essential part.

IV. While the illustrated steel balls 28 are free to move within the peripheral grooves, it is also possible to retain them with ball retainer similar to the usual ball bearing.

It will be apparent that various other modifications are possible without departing from the scope and spirit of the invention, and the practical form of the invention is limited by no means other than the annexed claims.

The wheel of the construction described above according to the invention has the following merits:

i. The peripheral grooves 29 and 30 defined by the end portion of the outer shell 21 and flange 26 of the sleeve 25 respectively are far deeper than those of the usual ball bearings, so that the wheel construction will not be ruptured even if it experiences torsional forces.

ii. Since two ball bearings have their sleeves 25 abutted against each other for mutually covering their weakpoint, whatever forces acting on the wheel in either right hand or left hand direction may be sufficiently borne.

iii. Smooth rotation may always be ensured irrespective of whatever force is exerted to the wheel.

iv. The outer shell 21 and sleeve 25 have such a structure that they can be obtained by simply processing single members respectively, so that they can be produced on a mass production scale. Also, since the number of parts is small, the assembling can be readily made, so that the production cost may be very low.

v. If the outer shell 21 were provided with only one end portion 23 at only one end of the peripheral portion 22, the peripheral portion 22 would plump outwardly in the course of use, resulting in the loss of the smooth rotation of the wheel. According to the invention, this drawback is precluded because the outer shell 21 of the ball bearing 20 has the end portions 23 and 24 formed at the opposite ends of the peripheral portion 21.

What is claimed is:

1. A wheel ball bearing for a roller skate comprising:
a ring-shaped outer shell member produced from a single metal plate and being constituted by a peripheral portion of an annular configuration, first and second flanged end portions centrally extending integrally from the opposite ends of said peripheral portion, said first flanged end portion being substantially sufficiently larger in radial inward extent than said second one;
a first annular groove defined by said peripheral portion, and first and second flanged end portions;
a plurality of steel balls received in said first annular groove in an annular arrangement; and,
a tubular sleeve member including a peripheral portion, a collar means radiating outwardly from connection therewith, the collar means comprising an inner annular ridge integrally formed on said sleeve member to define a second annular groove between itself and a radially outwardly extending flange provided at one end of the sleeve member for receiving said steel balls, said ridge being opposite to said first flanged end portion for cooperating therewith to prevent the departure of the sleeve member off the outer shell member, said radially outwardly extending flange being axially spaced from said collar means and being so large as to form, between a radially inner portion of this flange, said collar means and said peripheral portion of the tubular sleeve member, said second annular groove of such a depth as to receive therein a substantially major part of said steel balls, said sleeve member being fitted centrally of the annular arrangement of said steel balls so that said second flanged end portion is brought into relation opposite to said radially extending flange, for retaining said steel balls in said groove by said flanged end portions, said collar means and said radially extending flange.

2. A wheel ball bearing for a roller skate comprising:
a ring-shaped outer shell member produced from a single metal plate and being constituted by a peripheral portion of an annular configuration, first and second flanged end portions centrally extending integrally from the opposite ends of said peripheral portion, said first flanged end portion being substantially sufficiently larger in radial inward extent than said second one;
a first annular groove defined by said peripheral portion, and first and second flanged end portions;
a plurality of steel balls received in said first annular groove in an annular arrangement; and,
a tubular sleeve member including a peripheral portion, a collar means comprising a retainer ring fitted on an end portion thereof for prevention of the departure of the sleeve member off the outer shell member, said retainer ring having an end wall which radially inwardly extends from one end thereof and is provided with a central opening of a diameter at least as large as that of the interior of the sleeve member, and having a radially outwardly extending flange axially spaced from said collar means at one end of the tubular sleeve member which is so large as to form between a radially inner portion and said peripheral portion of the tubular sleeve member a second annular groove of such a depth as to receive therein a substantially major part of said steel balls, said sleeve member being fitted centrally of the annular arrangement of said steel balls so that said second flanged end portion is brought into relation opposite to said radially extending flange, for retaining said steel balls in said grooves by said flanged end portions, said collar means and said radially extending flange.

3. A roller skate wheel, comprising:

a wheel body having a throughbore provided with two annular shoulders which face away from one another;

two like ball bearing assemblies received in the throughbore against respective ones of said shoulders and having ends which abut one another intermediate the ends of the throughbore;

each ball bearing assembly comprising:

a unitary outer shell fabricated of metal plate so as to include an annular outer peripheral portion flanked at the opposite ends thereof by respective radially inwardly extending annular end portions, one end portion extending further radially inwardly than the other to respectively provide a smaller diameter opening through the one end portion and a larger diameter opening through the other end portion;

a unitary inner sleeve member including a radiating annular flange having a tubular end portion coaxially extending from one face thereof to provide a throughbore which extends through both the flange and the tubular end portion;

the tubular end portion of the inner sleeve member being inserted through the larger and smaller diameter openings of the outer shell to the extent that the axially outer face of the annular flange is generally in radial alignment with the axially outer face of said other end portion of the outer shell and the smaller diameter opening is disposed intermediate the axial extremes of said tubular end portion;

a circle of bearing balls confined between the outer shell and inner sleeve member in an annular space delimited by the tubular outer peripheral portion and said one end portion of the outer shell and the annular flange and tubular end portion of the inner sleeve member;

and retainer means provided on said tubular end portion for normally preventing axial withdrawal of the inner sleeve member from the outer shell, the retainer means comprising:

an annular ridge provided exteriorly, circumferentially on the tubular end portion on the opposite side of the circle of bearing balls from said radiating annular flange, the annular ridge being of such height that the ridge is locally deformed by contact with the bearing balls when the inner sleeve member is inserted through said openings to said extent.

4. A roller skate wheel, comprising:

a wheel body having a throughbore provided with two annular shoulders which face away from one another;

two like ball bearing assemblies received in the throughbore against respective ones of said shoulders and having ends which abut one another intermediate the ends of the throughbore;

each ball bearing assembly comprising:

a unitary outer shell fabricated of metal plate so as to include an annular outer peripheral portion flanked at the opposite ends thereof by respective radially inwardly extending annular end portions, one end portion extending further radially inwardly than the other to respectively provide a smaller diameter opening through the one end portion and a larger diameter opening through the other end portion;

a unitary inner sleeve member including a radiating annular flange having a tubular end portion coaxially extending from one face thereof to provide a throughbore which extends through both the flange and the tubular end portion;

the tubular end portion of the inner sleeve member being inserted through the larger and smaller diameter openings of the outer shell to the extent that the axially outer face of the annular flange is generally in radial alignment with the axially outer face of said other end portion of the outer shell and the smaller diameter opening is disposed intermediate the axial extremes of said tubular end portion;

a circle of bearing balls confined between the outer shell and inner sleeve member in an annular space delimited by the tubular outer peripheral portion and said one end portion of the outer shell and the annular flange and tubular end portion of the inner sleeve member;

and retainer means provided on said tubular end portion for normally preventing axial withdrawal of the inner sleeve member from the outer shell;

the retainer means comprising:

an annulus received on the tubular end portion outside the outer shell, engaging both the exterior of the tubular end portion and the axially outer face of said one end portion of the outer shell.

\* \* \* \* \*